United States Patent [19] [11] Patent Number: 4,617,635
Shimizu [45] Date of Patent: Oct. 14, 1986

[54] NUMERICAL CONTROL MACHINING SYSTEM

[75] Inventor: Yutaka Shimizu, Aichi, Japan

[73] Assignee: Mitsubishi Denki K.K., Tokyo, Japan

[21] Appl. No.: 537,455

[22] PCT Filed: Jan. 11, 1983

[86] PCT No.: PCT/JP83/00010
§ 371 Date: Dec. 19, 1983
§ 102(e) Date: Sep. 9, 1983

[87] PCT Pub. No.: WO83/02416
PCT Pub. Date: Jul. 21, 1983

[30] Foreign Application Priority Data

Jan. 12, 1982 [JP] Japan .................................. 57-3149
Jan. 12, 1982 [JP] Japan .................................. 57-3150
Jan. 20, 1982 [JP] Japan .................................. 57-7232
Dec. 2, 1982 [JP] Japan .............................. 57-211975

[51] Int. Cl.⁴ .............................................. G05B 19/00
[52] U.S. Cl. .................................. 364/474; 364/511;
318/332; 318/571
[58] Field of Search .............. 318/332, 571; 364/474, 364/475, 511

[56] References Cited

U.S. PATENT DOCUMENTS 3,224,338 12/1965 Reynolds .................. 318/332
3,248,629 4/1966 Reynolds .................. 318/332
3,325,710 6/1967 Reynolds .................. 318/332
4,078,195 3/1978 Mathias et al. ............ 318/571 X
4,220,995 9/1980 Shoda ....................... 364/474 X
4,237,408 12/1980 Frecka ....................... 318/571
4,279,013 7/1981 Cameron et al. .......... 364/511 X
4,305,028 12/1981 Kostas et al. .............. 318/571 X
4,307,325 12/1981 Saar .......................... 318/472 X
4,346,444 8/1982 Schneider et al. ......... 364/475
4,412,158 10/1983 Jefferson et al. .......... 318/284

Primary Examiner—Jerry Smith
Assistant Examiner—Allen MacDonald
Attorney, Agent, or Firm—Sughrue, Mion, Zinn, Macpeak & Seas

[57] ABSTRACT

The load current of a spindle motor adapted to drive the tool of a numerical control machining apparatus or a feed motor adapted to move a machining table on which a workpiece is placed is detected during machining, the detection signal is applied to the input unit of a numerical control device to obtain the load output, and the load output is compared with an allowable value, so that the comparison signal is utilized to control the feed speed of the feed motor adapted to move the machining table of the apparatus or to output an alarm signal.

21 Claims, 26 Drawing Figures

| FIG. 2a | FIG. 2b |

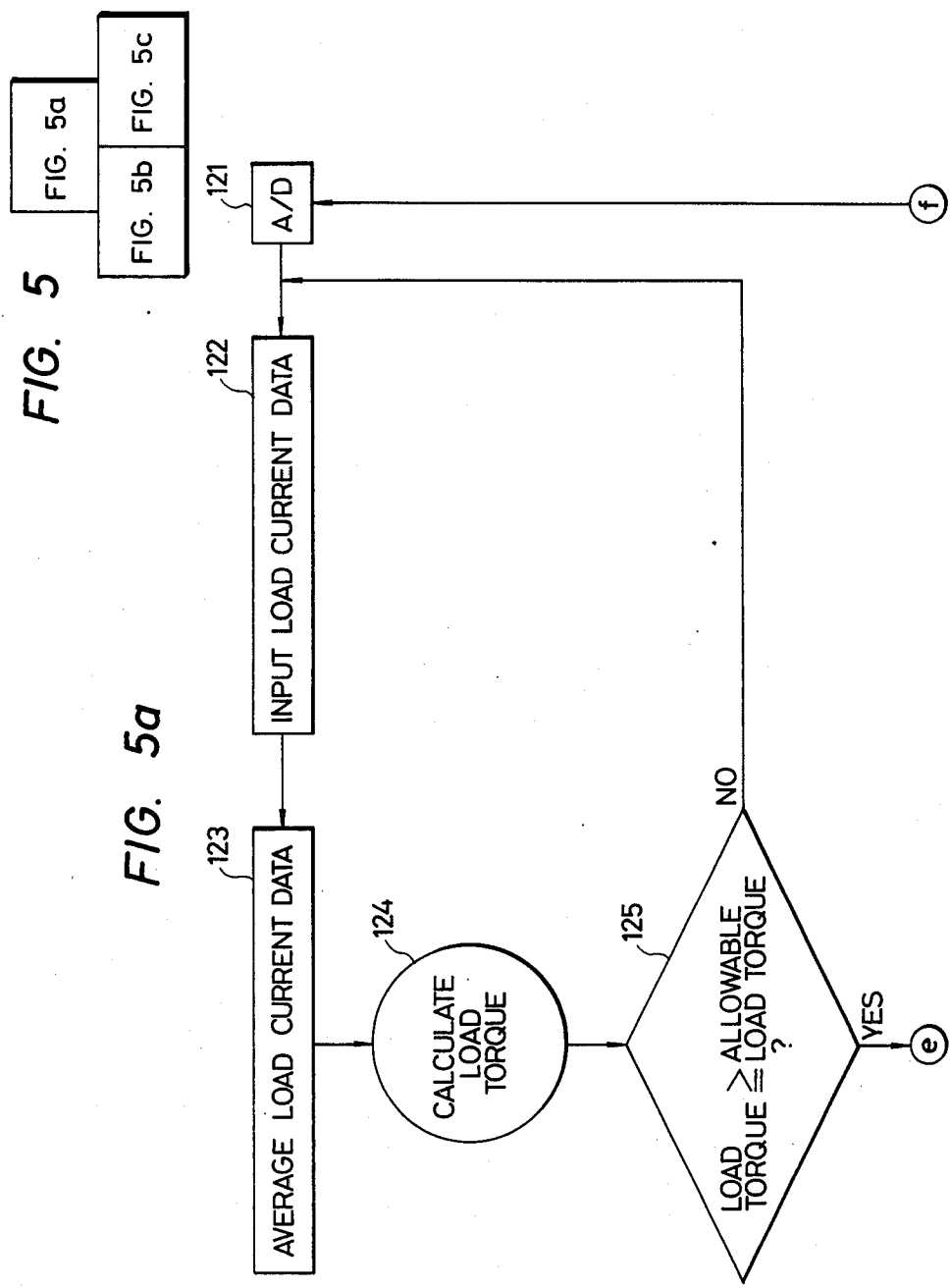

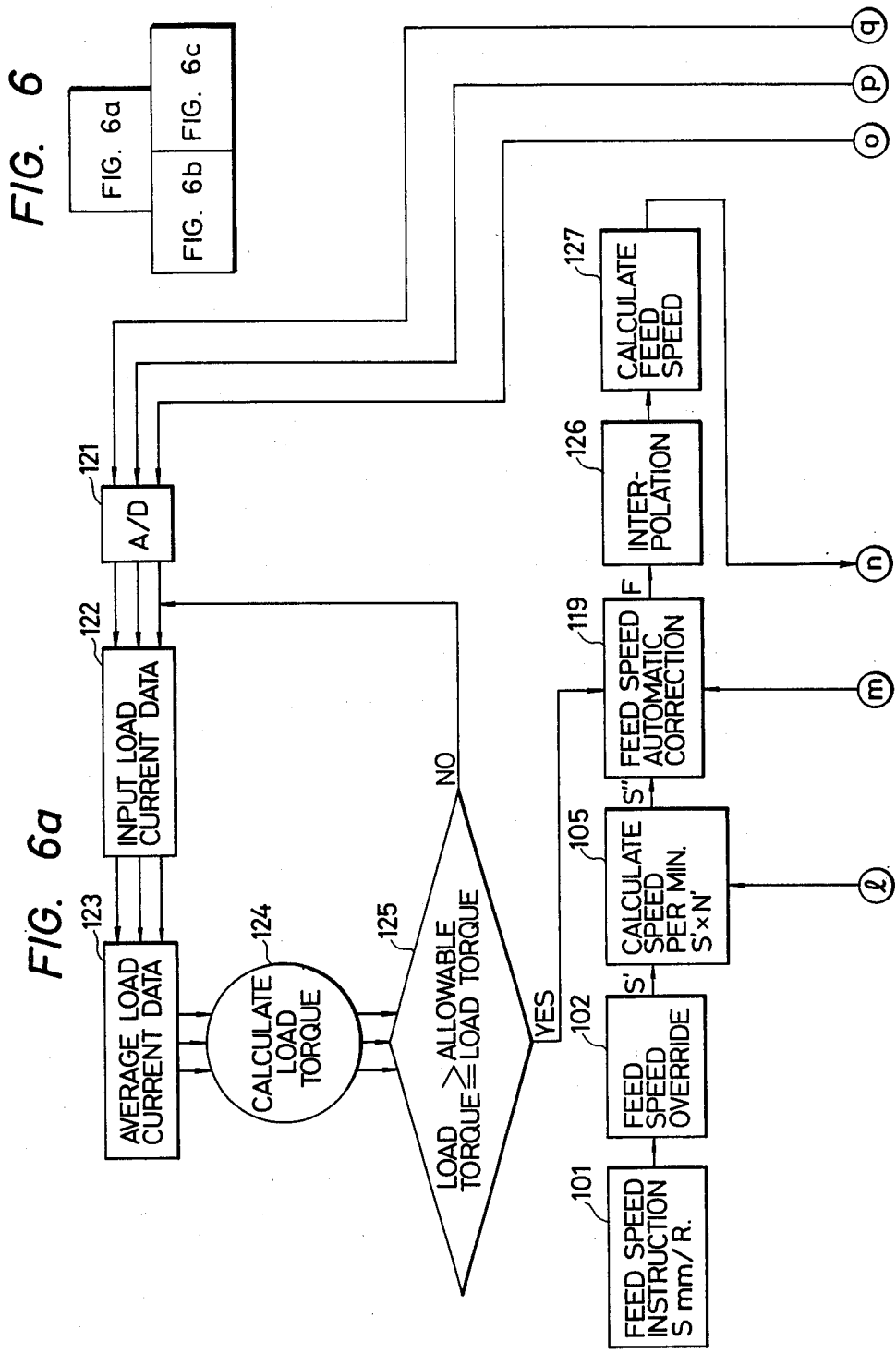

| FIG. 7a | FIG. 7b |

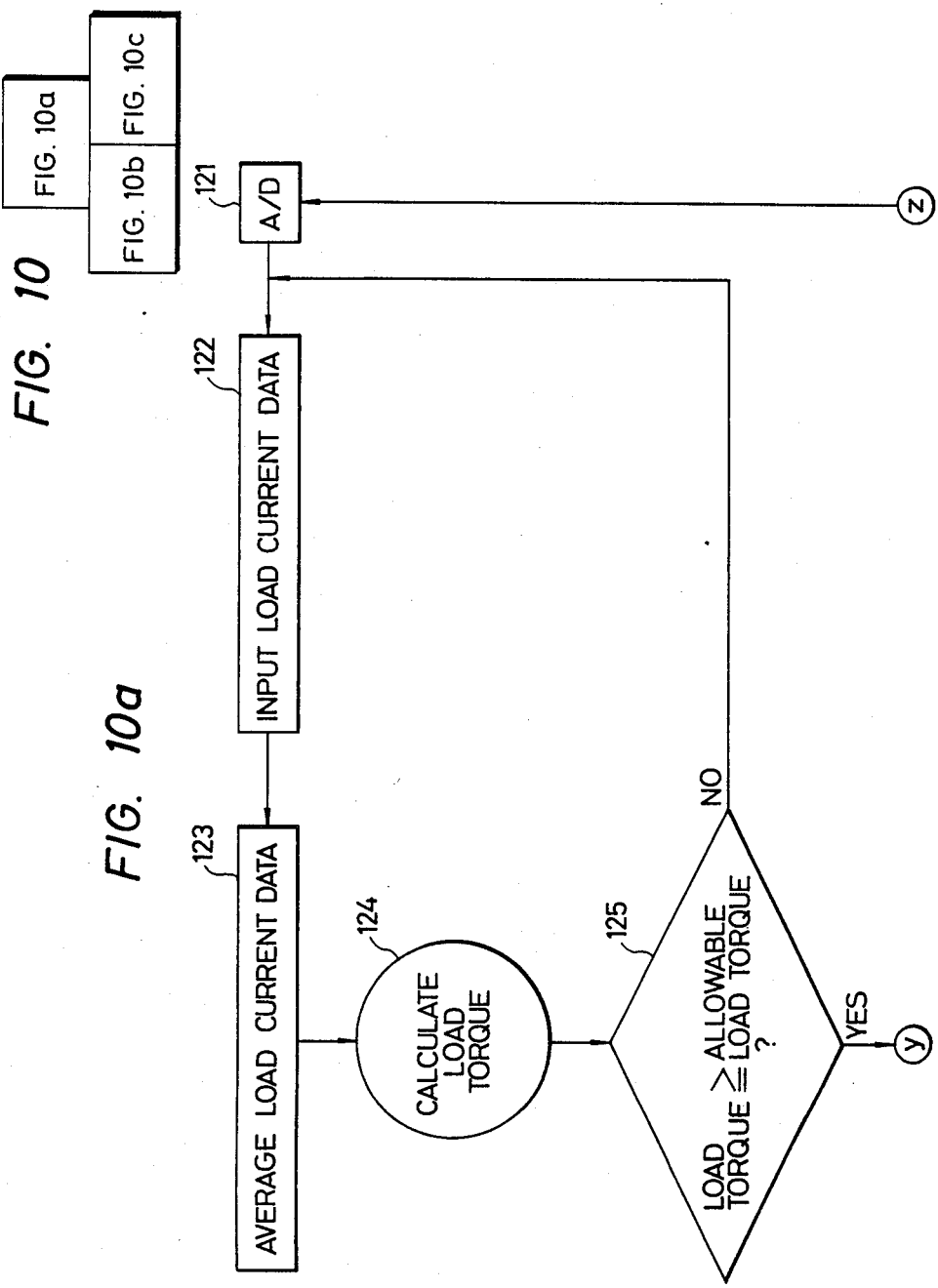

NUMERICAL CONTROL MACHINING SYSTEM

TECHNICAL FIELD

This invention relates to a numerical control machining system (hereinafter referred to as "an NC machining system", when applicable) in which a machining apparatus is controlled by a numerical control device (hereinafter referred to as "an NC", when applicable) to machine a workpiece, and more particularly to an NC machining system in which, during machining, the load of a workpiece is detected to monitor the machining conditions.

BACKGROUND ART

In a numerical control machining apparatus controlled by an NC (hereinafter referred to as "an NC machining apparatus", when applicable) numerical data instruct the position of a tool with respect to the workpiece so that the workpiece is machined under control of numerical values which are calculated by the NC. Accordingly, with the NC machining apparatus, a workpiece can be machined into an intricate product with ease and with high accuracy, and the productivity can be increased. In general, an NC machining apparatus, as shown in FIG. 1, comprises: an NC 20 for performing calculation on numeral data commands inputted through a terminal 10; and a machining device 30 which is controlled by the output data of the NC 20. The NC 20 comprises: an input unit 21 to which commands are inputted; an arithmetic unit 22 for performing operations on commands from the input section 21; a memory unit 23 for storing operation results outputted by the arithmetic unit 22 and commands from the input unit 21; a control unit 24 for controlling the operation of the arithmetic unit; and an output unit 25 for delivering operation values such as operation results provided by the arithmetic unit 22 out of the NC 20. On the other hand, in the machining apparatus 30, a tool 31 is held by a tool holder 32 which is secured to the chuck of a spindle 33, and the latter 33 is rotated by a spindle motor 34 which is driven by signals from the output unit 25 in the NC 20. A workpiece 40 is fixedly set on the table 35 of the apparatus 30 with a jig or the like. In FIG. 1, reference numeral 36 designates a ball screw for moving the table 35 along the X-axis. The ball screw 36 is driven through a gear box 37 by an X-axis feed motor 38, which is driven by signals from the output unit 25. Mechanisms (not shown) for moving the table 35 along the Y-axis and the Z-axis are provided, which are similar to the above-described mechanism for moving the table 35 along the X-axis. These mechanisms are also controlled by signals from the NC 20.

In the above-described NC machining system using the NC machining apparatus, machining time can be reduced by heavy load machining; however, the system suffers from a drawback that, when a load applied to the tool exceeds its allowable value, the tool is broken. This drawback may be eliminated by decreasing the load; however, in this case, the machining speed becomes low.

According, in the conventional NC machining system, in order to increase the machining efficiency and to prevent the tool from being damaged, machining conditions calculated according to the tool's allowable load are stored in the memory unit 23 of the NC 20, so that machining is carried out according to the machining conditions thus stored.

Thus, the conventional NC machining system is disadvantageous in the following points: When the load of the tool exceeds its allowable value abruptly, the tool may be broken, because the change of the load of the tool cannot be detected during machining. If, in order to prevent the trouble that, when the load of the tool changes abruptly, the tool is broken, the machining conditions are determined with the load of the tool being much lower than the allowable load, then the machining efficiency is lowered.

DISCLOSURE OF THE INVENTION

In this invention, the load current of a spindle motor or a feed motor in an NC machining apparatus is detected during machining, the detection signal is applied to the input unit of an NC to obtain the load output, and the load output is compared with an allowable value, so that the comparison signal is utilized to control the feed speed of the feed motor or to output an alarm signal, whereby the tool is protected from being damaged and the machining efficiency is improved.

BRIEF DESCRIPTION OF THE DRAWINGS

FIGS. 5, 5a, 5b and 5c are explanatory diagrams for a description of a second embodiment of the invention.

FIGS. 6, 6a, 6b, and 6c are explanatory diagrams for a description of a third embodiment of the invention.

Figure 9A:
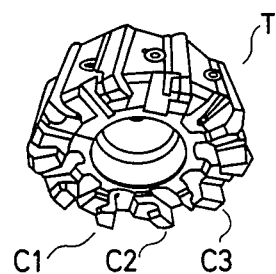
Figure 9B:
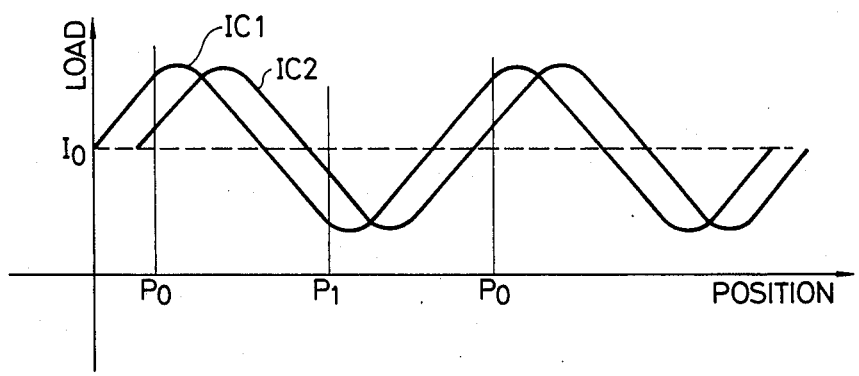

The part (a) of FIG. 9 is a perspective view shown a tool.

Figures 8, 8A:
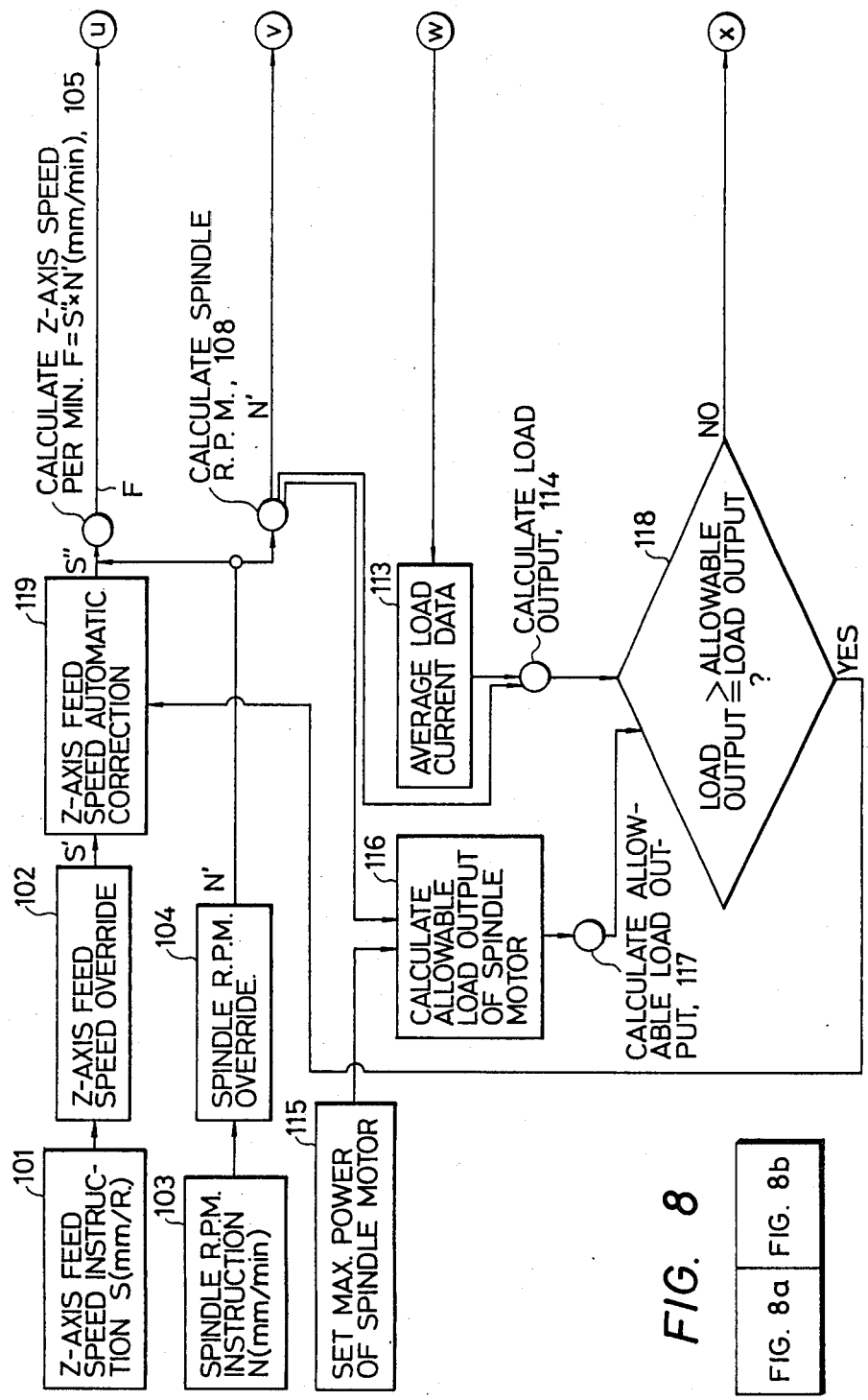
FIGS. 8, 8a and 8b are explanatory diagrams for a description of a fifth embodiment of the invention.
Figure 8B:
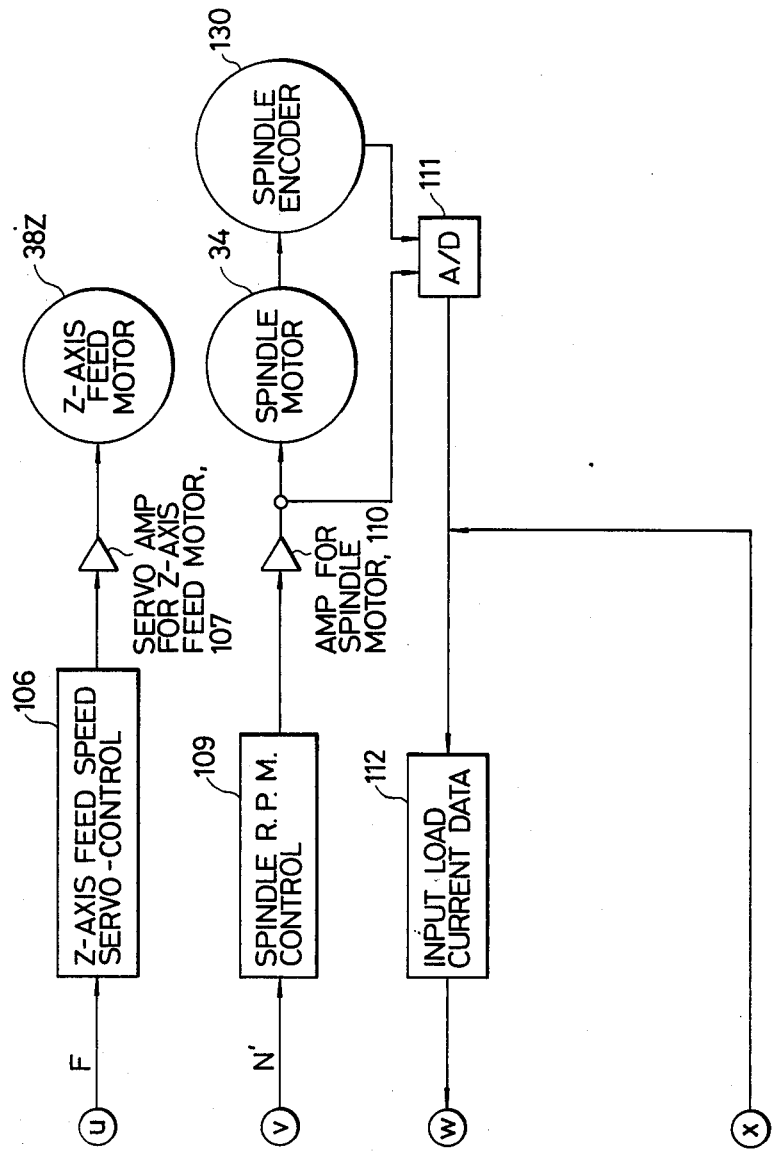
Figure 10B:
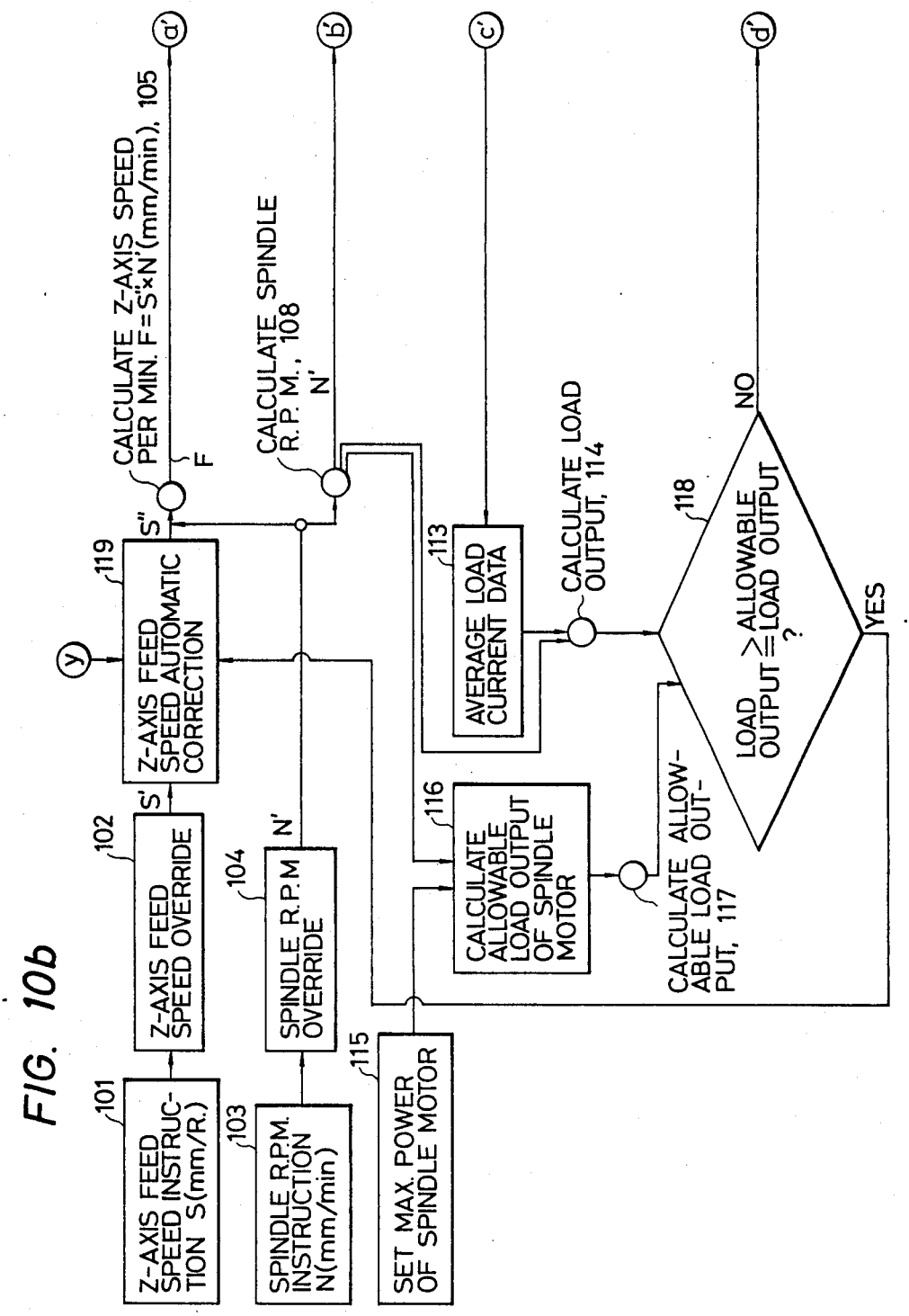
Figure 10C:
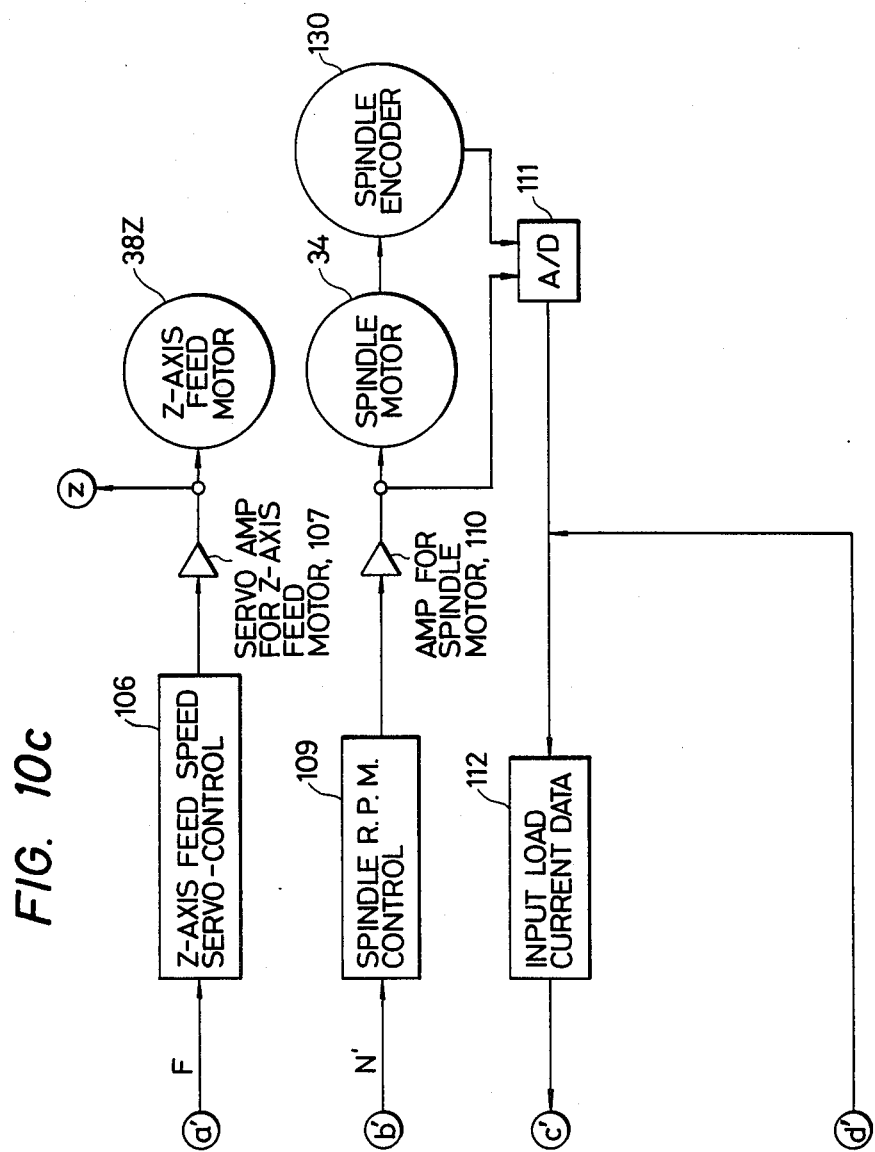

The part (b) of FIG. 9 is an explanatory diagram for a description of a method of detecting a spindle load current in the fifth embodiment in FIG. 8.

FIGS. 10, 10a, 10b, and 10c are explanatory diagrams for a description of a sixth embodiment of the invention.

DESCRIPTION OF THE PREFERRED EMBODIMENT

Figures 2, 2A:
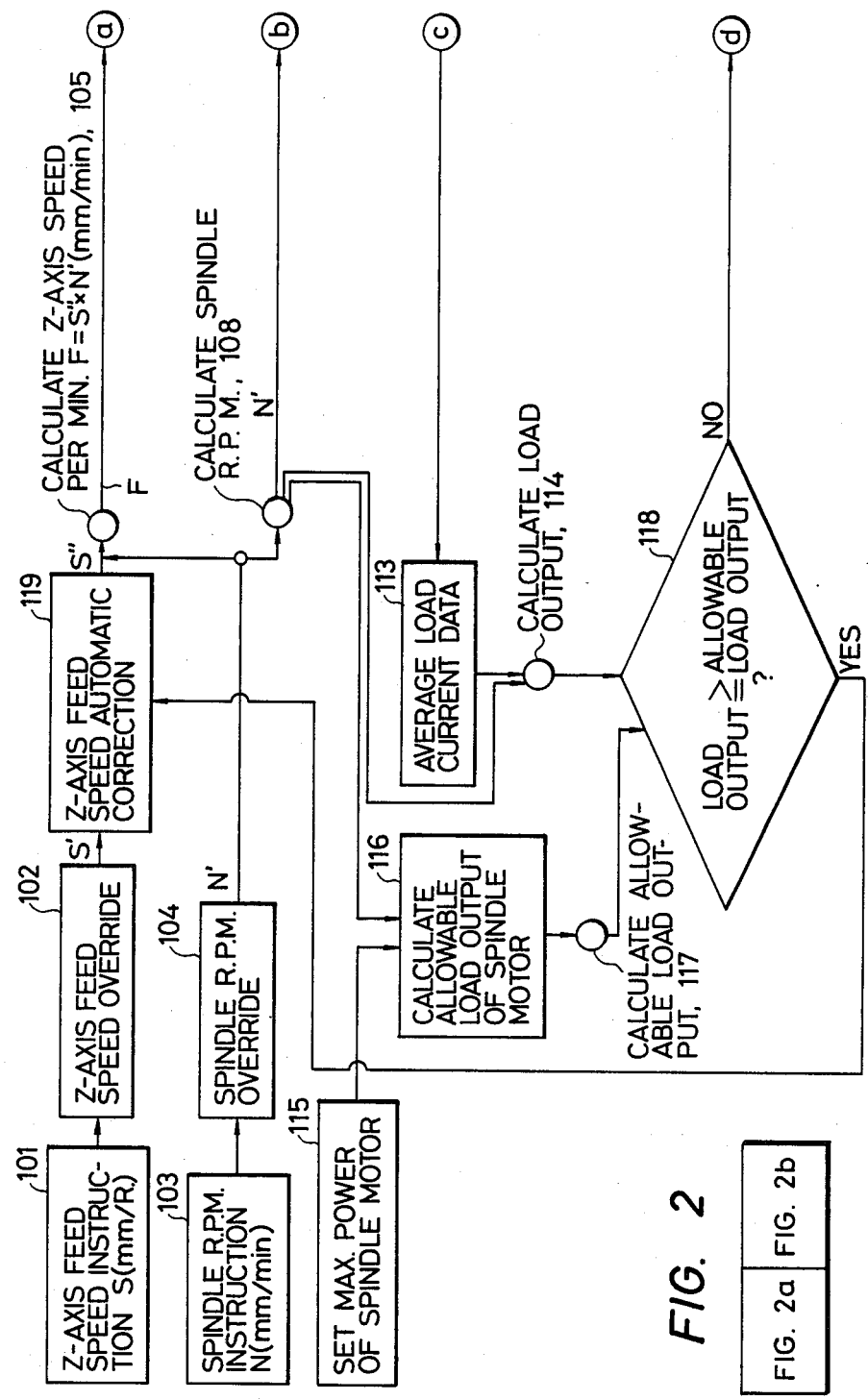
FIGS. 2, 2a, and 2b are explanatory diagrams for a description of a first embodiment of this invention.
Figure 2B:
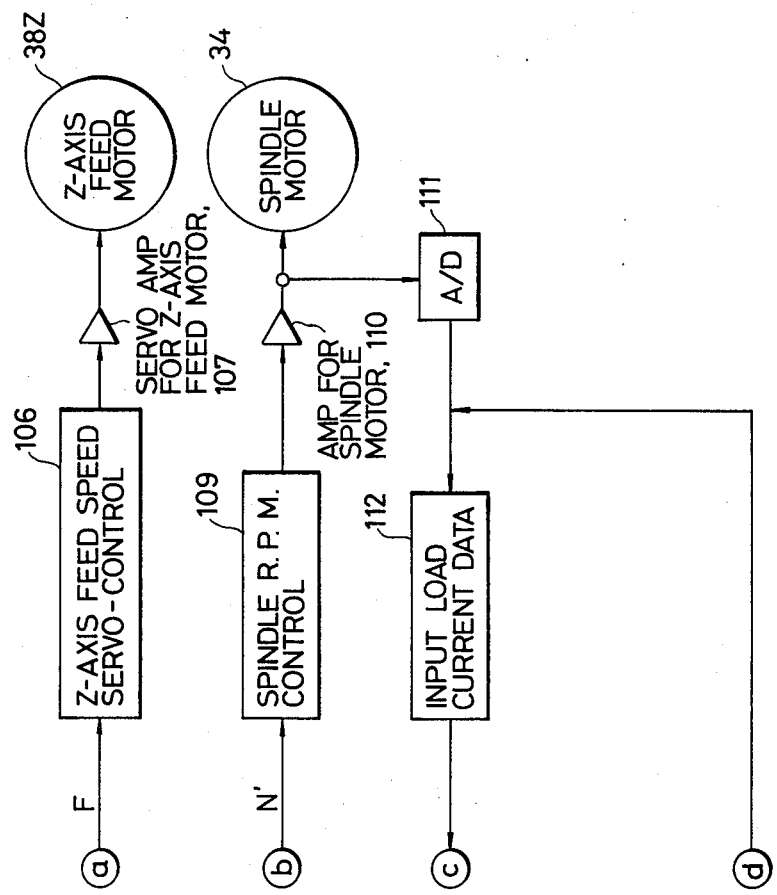

One embodiment of a numerical control machining system according to this invention will be described with reference to FIG. 2. FIG. 2 is an explanatory diagram for a description of the embodiment, in which the machining apparatus is a milling machine.

Figure 1:
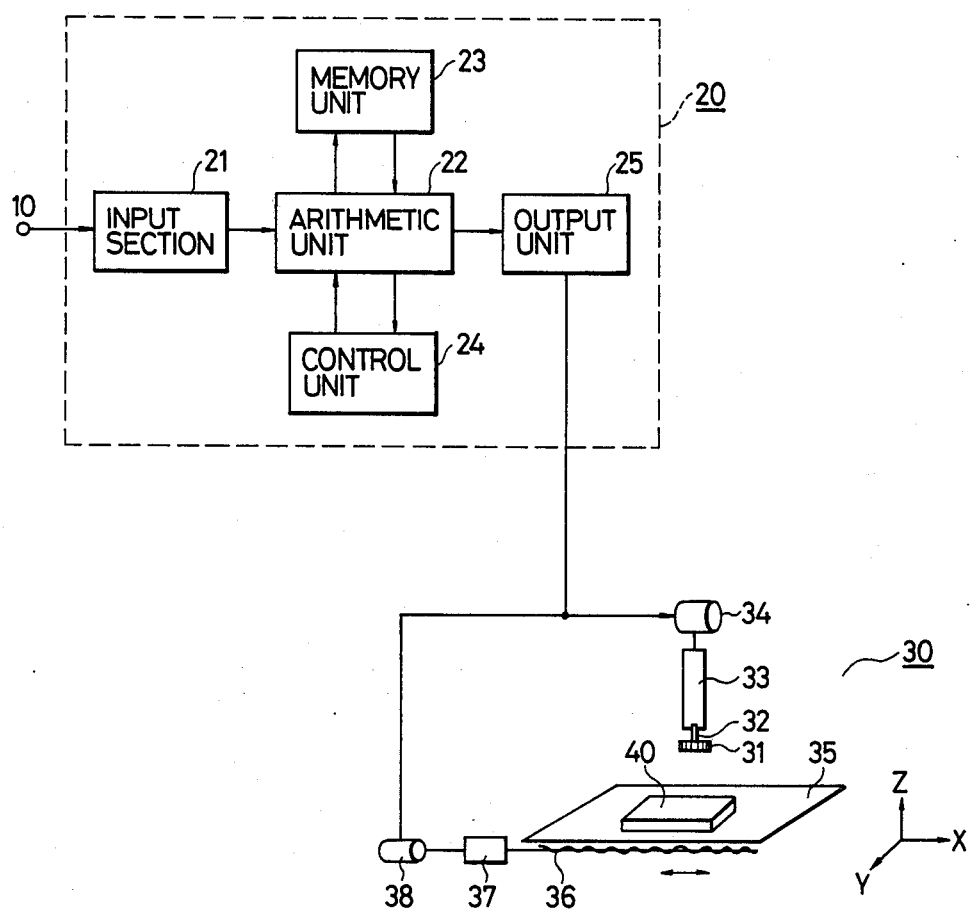
FIG. 1 is an arrangement diagram for outlining an NC machining apparatus.

In FIG. 2, a Z-axis feed speed S mm/revolution (101, FIG. 2) sent as an instruction to the Z-axis feed motor 38 in FIG. 1 is overridden to S' mm/revolution (102, FIG. 2), and a spindle speed N r.p.m. (103, FIG. 2) sent as an instruction to the spindle motor 34 is overridden to N' r.p.m. (104, FIG. 2). The term "overriding" as herein used is intended to mean that the operator, monitoring actual machining conditions, suitably corrects the Z-axis feed speed S and the spindle speed N. The Z-axis feed motor is to move the table 35 toward the main spindle 33. In the embodiment, the feed motor 38Z is the Z-axis feed motor.

According to the Z-axis feed speed S' and the spindle speed N', the NC calculates a Z-axis speed per minute $F = S' \times N'$ (mm/min) (105, FIG. 2) which is supplied to a Z-axis feed speed servo control (106, FIG. 2). The Z-axis feed speed servo control drives a Z-axis feed motor 38Z through a Z-axis feed motor servo amplifier (107, FIG. 2) according to the Z-axis feed speed per minute F. Thus, the Z-axis feed motor rotates as required, to feed table along the Z-axis at a predetermined speed. The spindle speed N' obtained through overriding is used for spindle speed calculation (108, FIG. 2) and is supplied to a spindle speed control (109, FIG. 2). The spindle speed control drives the spindle motor 34 through a spindle motor amplifier (110, FIG. 2) according to the spindle speed N'. Thus, the spindle motor rotates as required, to turn the spindle at a predetermined speed.

As the table is moved in the Z-axis direction by the Z-axis motor 38Z while the spindle 33 is turned by the spindle motor 34 as described above, a desired recess or hole can be formed in the workpiece 40 with the tool mounted on the spindle.

One of the specific features of this embodiment resides in that the load current of the spindle motor is detected during machining and is applied to the NC to obtain the load output of the spindle motor, and the load output thus obtained is compared with its allowable value, to control the feed speed of the Z-axis feed motor. In other words, the load current (shunt current) is detected in the spindle motor amplifier 110 and is subjected to A/D conversion (111, FIG. 2). The load current data is inputted to the numerical control device (112, FIG. 2) and is then averaged (113, FIG. 2).

Figure 3:
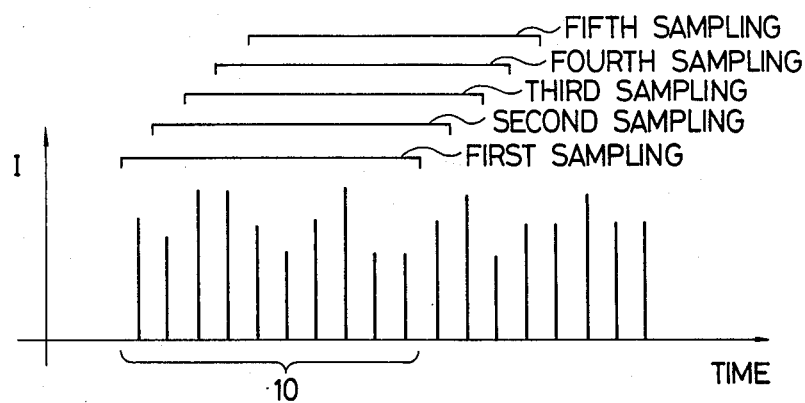
FIG. 3 is a graphical representation for a description of a method of averaging load current data.

Another specific feature of the embodiment is to average the load current data. This averaging method is shown in FIG. 3, in which the horizontal axis represents time while the vertical axis represents current. The load current is sampled periodically, for instance ten times at time intervals of 100 m sec. The ten load current values thus obtained are averaged, to average the load current data. If, of the ten load current values, the maximum and minimum ones are disregarded, and the remaining eight load current values are used for averaging the load current data, then the load current can be detected more accurately.

Referring back to FIG. 2, after averaging the load current data has been achieved, a load output is calculated from the average load current. An allowable load output is calculated (116, FIG. 2) from the maximum output of the spindle motor (115, FIG. 2) and the spindle speed N' (108, FIG. 2). The load output (114) is compared (118, FIG. 2) with an allowable load output (117, FIG. 2) equivalent to a tool's allowable load (which is a predetermined value). When the load output is equal to or higher than the allowable load output, i.e., the tool's allowable load, the Z-axis feed speed is automatically corrected into S" (119, FIG. 2). Accordingly, the Z-axis feed speed per minute F is automatically corrected, and therefore the load output of the spindle motor 34 becomes lower than the tool's allowable load, whereby the tool is protected from damage. When the load output is lower than the tool's allowable load, the load current data of the spindle motor is continuously inputted without correcting the Z-axis feed speed S'.

As is clear from the above description, in the first embodiment of the invention, the Z-axis feed motor feed speed can be controlled according to the load output of the spindle motor.

Figure 4:
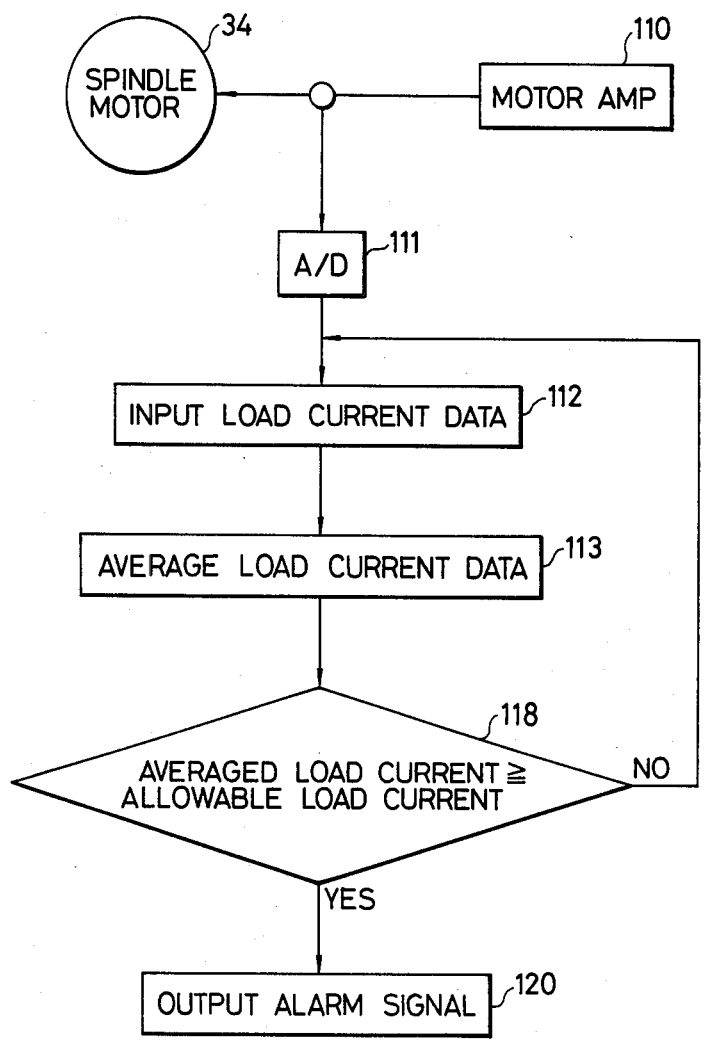
FIG. 4 is an explanatory diagram for a description of the generation of an alarm signal in the first embodiment in FIG. 2.

In the first embodiment, the load output is compared with the allowable load output, and when the former is higher than the latter, the Z-axis feed speed S' is automatically corrected to S", as described above. In this connection, an alarm signal may be outputted (120, FIG. 4), as shown in FIG. 4. In FIG. 4, parts corresponding functionally to those already described with reference to FIG. 2 are designated by corresponding reference numerals and the preceeding descriptions are applicable. The alarm signal may be used, for instance, for stopping the NC machining apparatus.

In the first embodiment in FIG. 2, the feed speed of the Z-axis feed motor 38Z is controlled. The technical concept is applicable to the X-axis feed motor 38X for moving the table 35 along the X-axis and the Y-axis feed motor 38Y for moving the table along the Y-axis, to control the feed speeds thereof.

Figure 5B:
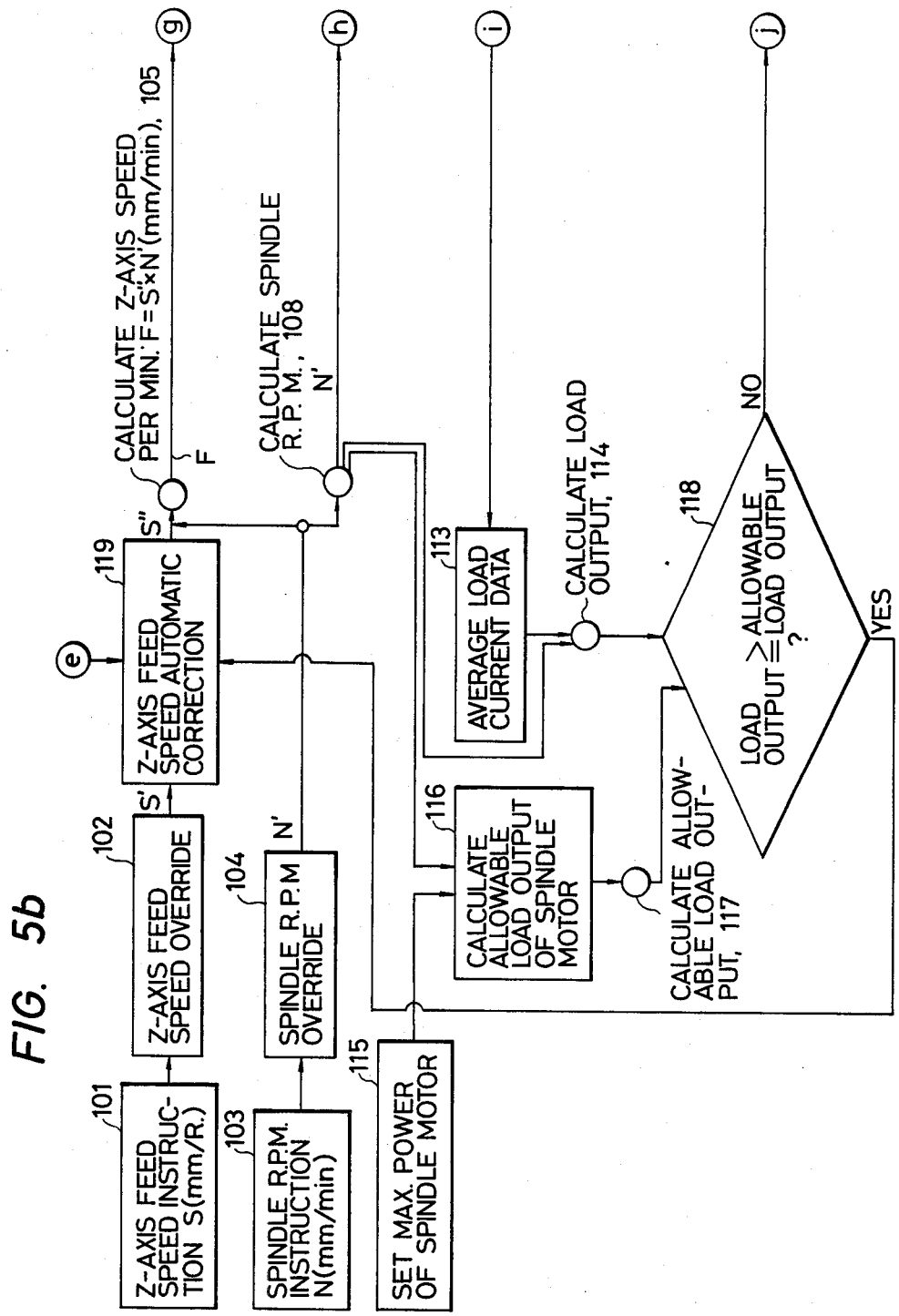
Figure 5C:
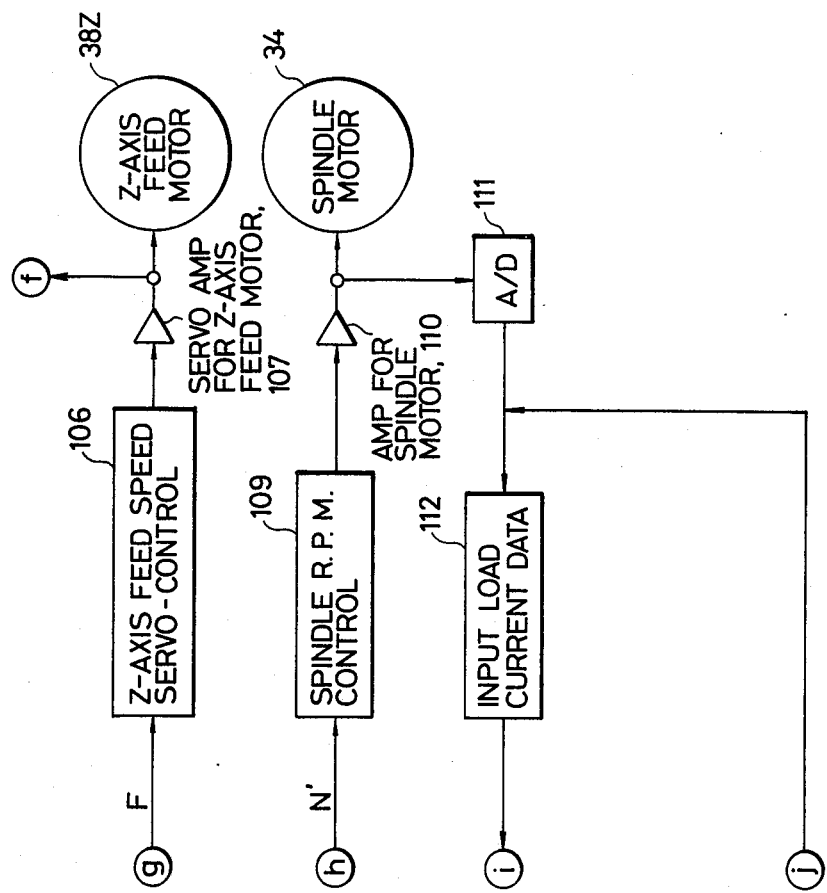

FIG. 5 shows a second embodiment of the invention. In FIG. 5, those components which have been already described with reference to the first embodiment in FIG. 2 are accordingly designated by the same reference numerals, and it is unnecessary to describe them again in detail. In the second embodiment also, the machining apparatus is a milling machine, and of the feed motors, only the Z-axis feed motor is indicated as a typical one.

In the first embodiment shown in FIG. 2, the load current of the spindle motor 34 is detected during machining, to control the feed speed of the Z-axis feed motor. On the other hand, in the second embodiment in FIG. 5, the load current of the spindle motor 34 is detected during machining, and the load current of the Z-axis feed motor 38Z is detected during machining and is applied to the NC. Furthermore, the load torque is obtained, and according to the load output of the spindle motor 34 and the load torque of the Z-axis feed motor 38Z the feed speed of the Z-axis feed motor 38Z is controlled.

That is, in FIG. 5, a Z-axis feed motor servo amplifier 107 provides a load current (shunt current) during machining and is subjected to A/D conversion (121, FIG. 5), and the load current data is inputted to the numerical control device (122, FIG. 5) and is averaged (123, FIG. 5). This load current data averaging method is similar to that described with reference to the first embodiment. After averaging of the load current data has been achieved, a load torque is calculated from the averaged load current (124, FIG. 5). The load torque is compared with a tool's allowable load torque (which is predetermined)(125, FIG. 5). When the load torque is larger than its allowable value, then the Z-axis feed speed S' is automatically corrected to S". Accordingly, the Z-axis feed speed per minute F is also automatically corrected, so that the load torque of the Z-axis feed motor 38Z becomes smaller than its allowable value and the damage of the tool can be prevented. When the load torque is smaller than the allowable load torque, inputting the load current data of the Z-axis feed motor is continued without correcting the Z-axis feed speed S'.

As is apparent from the above description, in the second embodiment of the invention, the feed speed of the Z-axis feed motor can be controlled according to the load output of the spindle motor and the load torque of the Z-axis feed motor.

In the first and second embodiments, the technical concept of the invention is applied to the spindle and the Z-axis of the milling machine; however, it should be noted that the technical concept of the invention is applicable to the other axes of the milling machine, namely, the X-axis and the Y-axis, and to other machining apparatuses such as lathes.

Figure 6B:
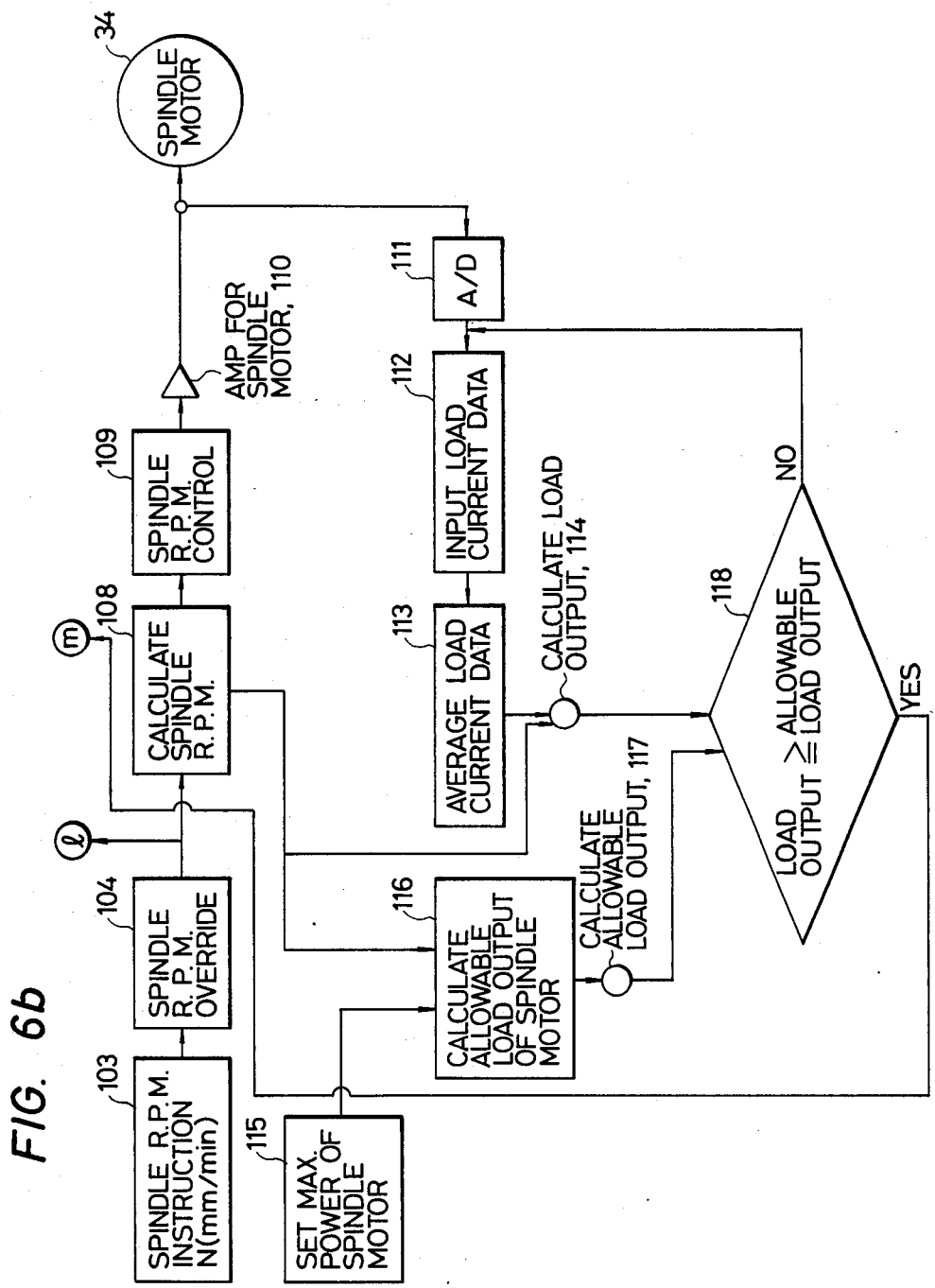
Figure 6C:
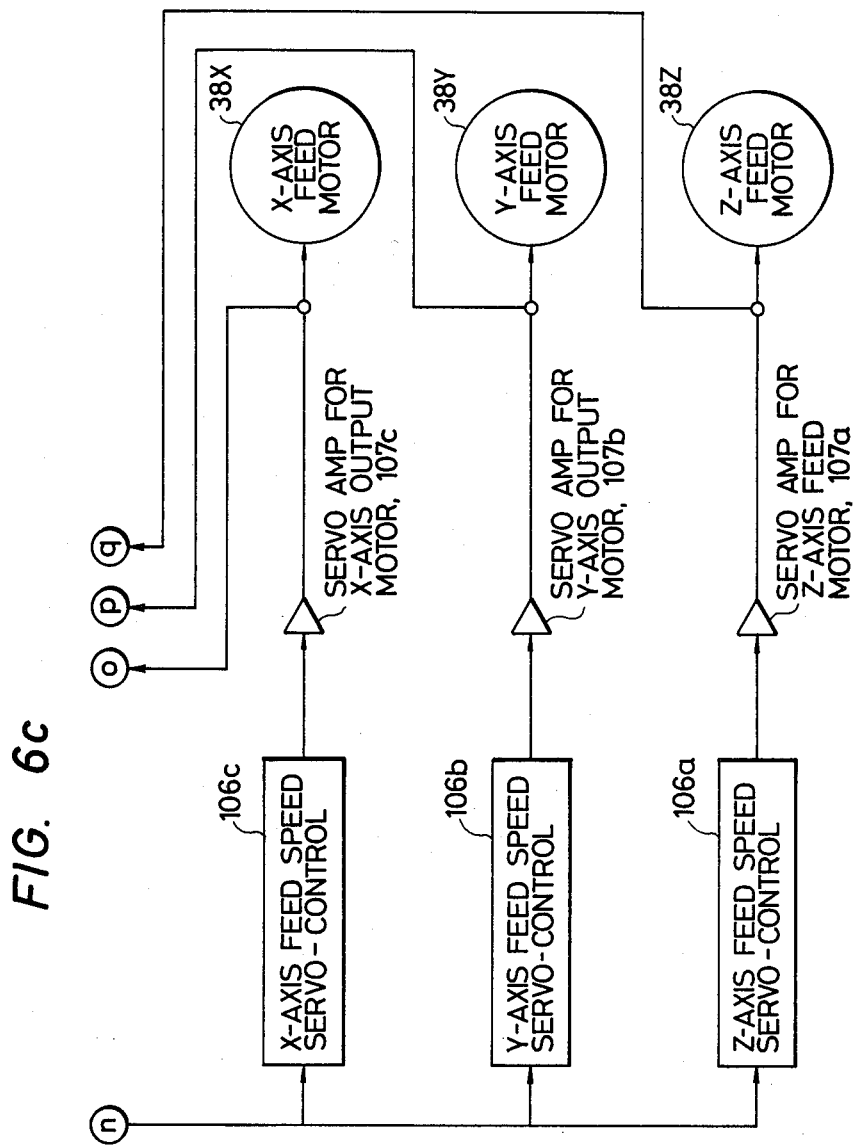

In the case where the system according to the second embodiment in FIG. 5 is employed to move the table 35 with the X-axis feed motor 38X, Y-axis feed motor 38Y and Z-axis feed motor 38Z, the operation should be carried out as indicated in FIG. 6. In FIG. 6, those parts which have been already described with reference to FIG. 5 are accordingly designated by the same reference numerals or characters, and it is unnecessary to describe them in detail again.

In a third embodiment of the invention shown in FIG. 6, Load currents supplied to the X-axis feed motor 38X, Y-axis feed motor 38Y and Z-axis feed motor 38Z are detected by servo amplifiers 107a, 107b and 107c, respectively, and are subjected to A/D conversion (121). The resultant data are inputted to the NC (122) and are averaged (123) to calculate load torques, respectively. The load torques are compared with their allowable torques (125). When for at least one of the axes, the load torque is larger than its allowable load torque, the feed speed is automatically corrected (119).

In the third embodiment in FIG. 6, interpolation is carried out (126, FIG. 6) in order to distribute the to the three axes the signal F which is obtained automatically correcting the feed speed, and the resultant interpolation signal is utilized to calculate feed speeds for the axes (127, FIG. 6) which are applied, as signals, to the servo controls 106a, 106b and 106c.

Figures 7, 7A:
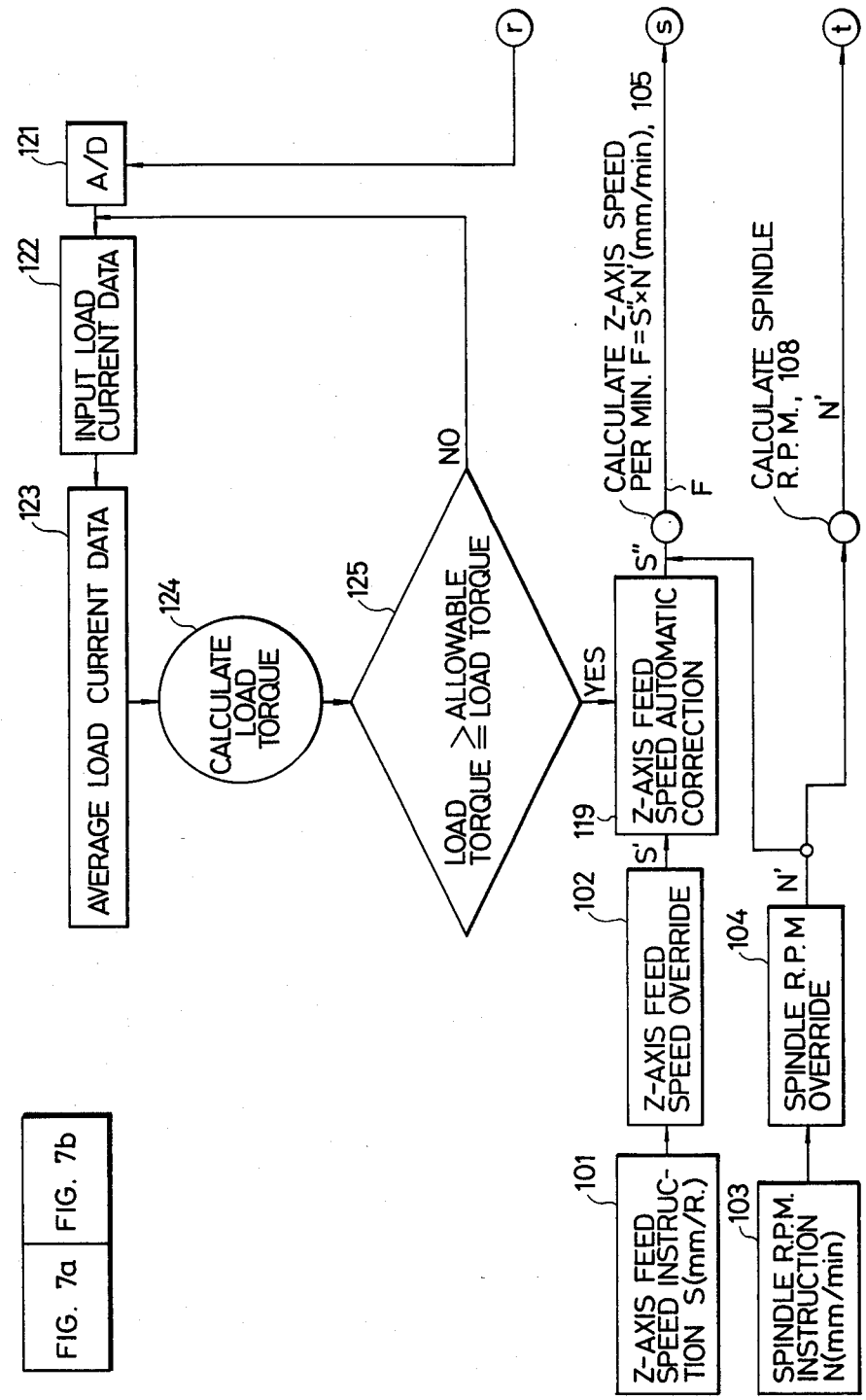
FIGS. 7, 7a and 7b are explanatory diagrams for a description of a fourth embodiment of the invention.
Figure 7B:
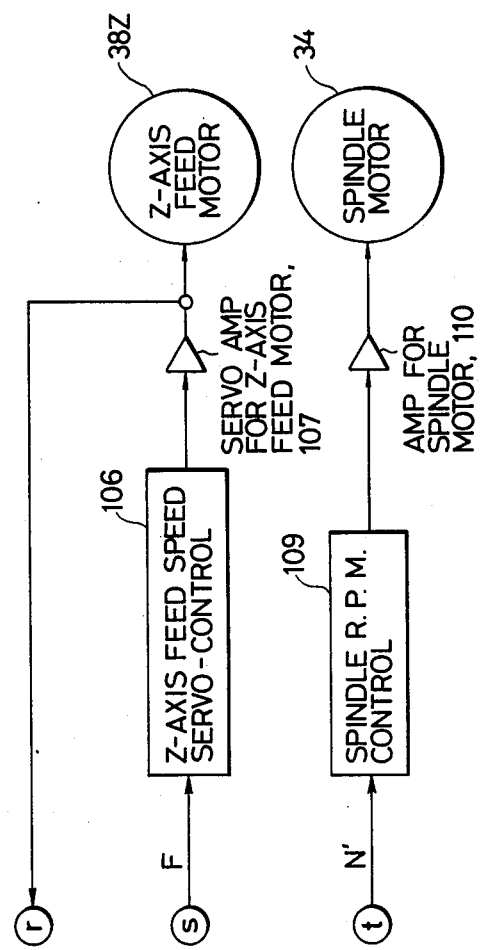

FIG. 7 shows a fourth embodiment of the invention. In FIG. 7, those components which have been already described with reference to the second embodiment in FIG. 2 are accordingly designated by the same reference numerals or characters, and are not described in detail here. In the fourth embodiment, only feed motor 38Z is indicated, and the machining apparatus is a drilling machine.

In the second embodiment shown in FIG. 5, the load current of the spindle motor 34 is obtained during machining, and the load current of the Z-axis feed motor 38Z is detected and inputted to the NC and the load torque is obtained, so that according to the load output of the spindle motor 34 and the load torque of the Z-axis feed motor, the feed speed of the Z-axis feed motor 38Z is controlled. On the other hand, in the fourth embodiment shown in FIG. 7, the load current of the Z-axis feed motor 38Z is detected during machining and is inputted to the NC, and the load torque thereof is obtained, so that according to the load torque of the Z-axis feed motor 38Z the feed speed of the Z-axis feed motor 38Z is controlled.

More specifically, similarly as in the first embodiment shown in FIG. 2, the Z-axis feed motor 38Z moves the table 35 along the Z-axis and the spindle motor 34 rotates the spindle 33, so that a recess or hole having a desired configuration is formed in the workpiece 40 with a drill 31 coupled to the spindle. The specific feature of the fourth embodiment resides in that the load current of the Z-axis feed motor is detected during machining and the load torque of the Z-axis feed motor is obtained from the load current thus detected, to control the feed speed of the Z-axis feed motor 38Z. In other words, in the fourth embodiment in FIG. 7, the load current for machining is detected from a Z-axis feed motor servo amplifier 107 and is subjected to A/D conversion (121), and the resultant load current data is inputted to a numerical control device for instance (122) and is averaged (123).

The load current data averaging method is similar to that which has been described with reference to the first embodiment in FIGS. 2 and 3.

In FIG. 7, after the load current data have been averaged, the load torque is calculated according to the averaged load current (124). The load torque is compared with a predetermined allowable load torque (125). When the former is larger than the latter, the Z-axis feed speed S' is automatically corrected into a value S" (119). Accordingly, the Z-axis feed speed per minute F is also automatically corrected, so that the load torque of the Z-axis feed motor 38Z becomes smaller than the allowable load torque and the tool is prevented from being damaged. When the load torque is smaller than the allowable load torque, inputting the load current data is carried out again without correcting the Z-axis feed speed S'.

In the fourth embodiment in FIG. 7, the machining apparatus is a drilling machine, and the technical concept of the invention is applied to the Z-axis. However, it should be noted that the technical concept is applicable to the other machining axes such as the X-axis and the Y-axis, and that the technical concept of the invention can be applied to other machining apparatuses such as a milling machine and a lathe.

In the case of a milling machine, a large load is applied to the spindle motor, and therefore it is preferable to employ the system according to the first embodiment shown in FIG. 2. In the case of a drilling machine, a large load acts on the Z-axis motor, and therefore it is desirable to employ the system according to the fourth embodiment shown in FIG. 4.

FIG. 8 shows a fifth embodiment of the invention. In FIG. 8, those parts which have been already described with reference to the first embodiment in FIG. 2 are accordingly designated by the same reference numerals or characters and their detailed descriptions are omitted. In the fifth embodiment also, the machining apparatus is a milling machine, and only the Z-axis feed motor is indicated.

The specific feature of the fifth embodiment resides in that the load current of the spindle motor 34 for machining is detected in synchronization with the rotation of the spindle to take into account the waviness which attributes, for instance, to the number of edges of a tool encountered during one revolution of the spindle, the load output of the spindle motor is obtained from the load current thus detected, and the load output thus obtained is compared with an allowable load output, to control the feed speed of the feed motor. In other words, in detecting the load of the spindle, in order to take into consideration the load current waviness attributing for instance to the number of edges of a tool, current at a certain angle in one revolution and that at an angle which is obtained by adding 180° to the aforementioned angle are averaged to cancel out the load current pulsation in one revolution, so that a load current small in variation is detected. Detecting the machining load current as described above makes it possible to detect the load of the tool.

Similarly as in the first embodiment in FIG. 2, the Z-axis feed motor 38Z moves the table 35 along the Z-axis and the spindle motor 34 rotates the spindle 33, so that a recess or hole having a desired configuration is formed in the workpiece 40 with the tool 31 secured to the spindle.

The specific feature of the fifth embodiment resides in that the machining load current of the spindle motor 34 is detected in synchronization with the rotation of the spindle, and the load output of the spindle motor is obtained from the load current, to control the feed speed of the Z-axis feed motor 38Z. In other words, in FIG. 8, the machining load current (shunt current) is detected from the spindle motor amplifier 110 and is subjected to A/D conversion in synchronization with a one revolution signal from a spindle encoder 130 (FIG. 8) and a half revolution signal which is formed from the one revolution signal, and the resultant load current data is inputted to the numerical control device (112) and is averaged (113).

This load current data averaging method is similar to that which has been described with reference to the first embodiment shown in FIGS. 2 and 3.

A method of detecting the load current of the spindle in the fifth embodiment will be described with reference to FIG. 9.

When the load current of the spindle 33 is detected, pulsation occurs during one revolution of the spindle because of the number of edges of the tool 31 or the inclination of the working face thereof. It has been known through experience that the pulsation is about 10 to 20% of the actual load. Therefore, the pulsation cannot be disregarded to suitably control the load. Therefore, a method of eliminating the pulsation to detect a true load current will be described.

In the part (a) of FIG. 9, reference character T designates a tool which is an end mill by way of example, and $C_1$, $C_2$ and $C_3$ cutting edges of the tools, respectively. In the part (b) of FIG. 9, reference characters $IC_1$ and $IC_2$ designate the pulsations which attributes to the loads of the cutting edges $C_1$ and $C_2$, respectively, $P_0$ the position of a one-revolution one-pulse signal of the spindle encoder 130, and $P_1$ the position which is apart by 180° from the position $P_0$.

As is apparent from the part (b) of FIG. 9, the pulsation can be eliminated by averaging two different load currents at two positions which are apart by 180° from each other. Accordingly, a load current pulsation due to each cutting edge is:

$$I_1 = \sum_{k=0}^{n-1} I\sin\left(\theta + k\frac{2\pi}{n}\right)$$

A load current pulsation at a position different by 180° in phase is:

$$I_2 = \sum_{k=0}^{n-1} I\sin\left(\theta + k\frac{2}{n} + \pi\right)$$

Averaging the two values, $(I_1 + I_2)/2 =$ $$\sum_{k=0}^{n}\left\{I\sin\left(\theta + k\frac{2\pi}{n}\right) + I\sin\left(\theta + k\frac{2\pi}{n} + \pi\right)\right\} = 0$$

In the above-described expressions, $I_1$ is the pulsation of the composite current of the load currents at the position $P_0$ which attribute to the cutting edges, and $I_2$ is the pulsation of the composite current of the load currents at the position $P_1$.

Therefore, the pulsation component can be eliminate by averaging the values at two positions which are different by 180° in phase from each other.

In the fifth embodiment in FIG. 8, after the load current data have been averaged (113), the load output is calculated according to the averaged load current (114). An allowable load output is calculated (116) from the maximum output which is set for the spindle motor 34 (115) and the spindle speed N' (108), and the aforementioned load output is compared (118) with the allowable load output (117) which is equivalent to the (predetermined) allowable load of the tool. When the load output is equal to or larger than the allowable load output, i.e., the tool's allowable load, the Z-axis feed speed S' is automatically corrected to a value S''. Accordingly, the Z-axis feed speed per minute F is also automatically corrected, so that the load output of the spindle motor becomes smaller than the tool's allowable load and the tool is protected from being damaged. When the load output is smaller than the tool's allowable load, the load current data of the spindle motor is carried out continuously with the Z-axis feed speed S' not corrected.

As is apparent from the above description, according to the fifth embodiment of the invention, the feed speed of the Z-axis feed motor can be controlled according to the load output of the spindle motor.

In the fifth embodiment, the feed speed of the Z-axis feed motor is controlled; however, the feed speed of the X-axis feed motor or Y-axis feed motor can be equally controlled.

FIG. 10 shows a sixth embodiment of the invention. In FIG. 10, parts which are equal to or correspond to those described with reference to the second embodiment in FIG. 2 of the fifth embodiment in FIG. 8 are accordingly designated by the same reference numerals or characters, and their detailed descriptions are omitted. In the sixth embodiment also, the machining apparatus is a milling machine and the feed speed of the Z-axis feed motor is controlled by way of example.

In the second embodiment in FIG. 5, the machining load current of the spindle 34 is detected to obtain the load output, the machining load current of the Z-axis feed motor 38Z is detected and inputted to the NC, and the load torque is obtained, so that the feed speed of the Z-axis feed motor 38Z is controlled according to the load output of the spindle motor 34 and the Z-axis feed motor 38Z. On the other hand, in the sixth embodiment in FIG. 10, the technical concept of the fifth embodiment in FIG. 8 is applied to the second embodiment in FIG. 5. That is, the machining load current of the spindle motor 34 is detected in synchronization with the rotation of the spindle to obtain the load output, the machining load current of the Z-axis feed motor 38Z is detected and inputted to the NC, and the load torque is obtained, so that the feed speed of the Z-axis feed motor 38Z is controlled according to the load output of the spindle motor 34 and the load torque of the Z-axis feed motor 38Z.

In the sixth embodiment in FIG. 10, the machining load current (shunt current) is detected from a Z-axis feed motor servo amplifier 107 and is subjected to A/D conversion (121), and the resultant load current data is inputted into the numerical control device (122) and averaged (123). A method of averaging the load current data is similar to that which has been described with reference to the first embodiment in FIG. 2. After the load current data have been averaged, the load torque is calculated according to the averaged load current 124. The load torque is compared with the (predetermined) allowable load torque of the tool (125). When the load torque is equal to or larger than the allowable load torque, the Z-axis feed speed S' is automatically corrected to a value S''. Accordingly, the Z-axis feed speed per minute F is also automatically corrected, so that the load torque of the Z-axis feed motor 38Z becomes smaller than the allowable load torque and the tool is protected from being damaged. When the load torque is smaller than the allowable load torque, the Z-axis feed speed S' is not corrected, and the load current data of the Z-axis feed motor is inputted continuously.

As is clear from the above description, according to the second embodiment of the invention, the feed speed of the Z-axis feed motor can be controlled according to the load output of the spindle motor and the load torque of the Z-axis feed motor.

In the sixth embodiment, the spindle of the milling machine and the Z-axis are controlled. However, the technical concept of the invention is applicable to other machining axes such as the X-axis and the Y-axis. Furthermore, the technical concept can be applied to other machining apparatuses such as for instance lathes.

In the NC machining system according to the invention, as was described above, the machining load current of the spindle motor or the feed motor is detected, the detection signal is inputted to the input unit of the NC to obtain the load output, and the load output is compared with the allowable load output, so that the comparison signal is utilized to control the feed speed of the feed motor and the tool is protected from being damaged. Furthermore, as the load output of the motor can be set close to the tool's allowable load, the machining efficiency can be increased.

I claim:

1. A numerical control machining system of the type including a spindle motor for rotating the spindle of a machining apparatus to which a tool is connected, a feed motor means for moving the table of said machining apparatus to which a workpiece is fixedly secured, and a numerical control device for controlling the speed of rotation of said spindle motor and the feed speed of said table, so that said workpiece is machined with said tool, characterized in that:
    said system further comprises detection means for detecting a machining load current of said spindle motor and sampling means for sampling said load current thus detected periodically at predetermined time intervals to provide an input to said numerical control device, and
    said numerical control device comprises means for averaging a predetermined number of load current data to obtain a load output of said spindle motor, means for comparing said load output with an allowable load output of said spindle motor which has been calculated in advance, and control means for controlling the feed speed of said feed motor means in accordance with said comparison.

2. A numerical control machining system as claimed in claim 1, further including means for generating an alarm signal when said load output is equal to or larger than said allowable load output.

3. A numerical control machining system as claimed in claim 1, comprising means for calculating sasid allowable load output from a maximum output set for said spindle motor and a spindle rotation speed command.

4. A numerical control machining system as claimed in claim 3, wherein said feed motor means comprises three table feed motors for three respective maching axes consisting of X-, Y- and Z-axes with respect to said spindle.

5. A numerical control machining system as claimed in claim 3, wherein said control means comprises calculating means for calculating a control signal value for controlling the speed of rotation of said spindle motor, said control signal value being calculated from said spindle rotation speed command.

6. A numerical control machining system as claimed in claim 3, wherein said control means comprises calculating means for calculating a control signal value for controlling the feed speed of said table, said control signal value being calculated from a feed speed per minute which is based on a feed speed command and said spindle rotation speed command.

7. A numerical control machining system as claimed in claim 6, wherein said control means comprises correcting means for correcting said feed speed command when said load output is larger than said allowable load output.

8. A numerical control machining system as claimed in claim 1, wherein said numercial control device includes first calculating means for calculating an allowable load torque for said feed motor and second calculating means for calculating a load torque of said feed motor from said load current thus detected, and said comparison means compares said load torque with said allowable load torque, so that when said load torque is equal to or larger than said allowable load torque, the feed speed of said feed motor is controlled.

9. A numerical control machining system as claimed in claim 8, wherein said numerical control device includes further sampling means for sampling said input to said numerical control device.

10. A numerical control machining system as claimed in claim 9, wherein said feed motor means comprises three table feed motors for three respective machining axes consisting of X-, Y- and Z-axes with respect to said spindle.

11. A numerical control machining system as claimed in claim 10, wherein said calculating means calculates respective load torques from the detected load current from each of said three feed motors, and said comparison means compares said respective load torques to respective allowable load torques.

12. A numerical control machining system as claimed in claim 1, said detecting means detedects said machining load current of said spindle motor in synchronization with the rotation of said spindle.

13. A numerical control machining system as claimed in claim 12, wherein said detection means includes a shunt resistor for detecting said load current of said spindle motor.

14. A numerical control machining system as claimed in claim 13, further including a spindle encoder for generating a signal corresponding to rotation of said spindle, and wherein said detection means includes synchronization means responsive to said signal from said spindle encoder for generating a synchronizing signal for synchronizing said detection means to the rotation of said spindle.

15. A numercial control machining system of the type including a spindle motor for rotating the spindle of a machining apparatus to which a tool is connected, a feed motor means for moving the table of the machining apparatus to which a workpiece is fixedly secured, and a numerical control device for controlling the speed of rotation of said spindle motor and the feed speed of said table, so that said workpiece is machined with said tool, characterized in that:

said system further comprises detection means for detecting a machining load current of said feed motor, and sampling means for sampling said load current thus detected periodically at predetermined time intervals to provide an input to said numberical control device, and said numerical control device comprises averaging means for averaging a predetermined number of load current data to obtain a load torque of said feed motor, means for calculating in advance an allowable load torque for said motor, and comparison means for comparing said load torque with said allowable load torque, so that when the former is equal to or larger than the latter, the feed speed of said feed motor is controlled.

16. A numerical control machining system as claimed in claim 15, wherein said feed motor means comprises three table feed motors for three respective machining axes consisting of X-, Y- and Z-axes with respect to said spindle.

17. A numerical control machining system as claimed in claim 16, wherein said averaging means obtains respective load torques from load currents detected from each of said three feed motors and wherein said comparison means compares each of said load torques with respective allowable load torques.

18. A numerical control machining system of the type including a spindle motor for rotating the spindle of a machining apparatus to which a tool is connected, a feed motor menas for moving the table of said machining apparatus to which a workpiece is fixedly secured, and a numerical control device for controlling the speed of rotation of said spindle motor and the feed speed of said table, so that said workpiece is machined with said tool, characterized in that:

said system further comprises detection means for detecting a machining load current of said spindle motor in synchronization with rotation of said spindle, and sampling means for sampling said load current thus detected periodically at predetermined time intervals to provide an input to said numerical control device, said numerical control device comprises means for calculating a load output of said spindle motor from said load current thus detected, means for calculating in advance an allowable load output for said spindle motor, and means for comparing said load output with said allowable load output of said spindle motor, so that when the former is equal to or larger than the latter, the feed speed of said feed motor is controlled.

19. A numerical control machining system as claimed in claim 18, wherein said detection means comprises a shunt resistor for detecting said load current of said spindle motor.

20. A numerical control machining system as claimed in claim 19, further including a spindle encoder for generating a signal corresponding to rotation of said spindle, and wherein said detection means includes synchronization means responsive to said signal from said spindle encoder for generating a synchronizing signal for synchronizing said detection means to the rotation of said spindle.

21. A numerical control machining system as claimed in claim 19, wherein said numerical control device calculates a load torque of said feed motor from said load current thus detected, said means for calculating an allowable load output calculates an allowable load torque and said comparison means compares said load torque with said allowable load torque, so that when said load torque is equal to or larger than said allowable load torque, the feed speed of said feed motor is controlled.

* * * * *